United States Patent [19]

Pringle

[11] Patent Number: 5,267,590

[45] Date of Patent: Dec. 7, 1993

[54] CONTAINER FILLER, ESPECIALLY FOR BALLAST HAVING CONTOURED SWEEP FOR ARRAYING CONTAINERS

[75] Inventor: Frank G. Pringle, Medford, N.J.

[73] Assignee: R & D Innovators, Inc., Medford, N.J.

[21] Appl. No.: 957,413

[22] Filed: Oct. 5, 1992

Related U.S. Application Data

[63] Continuation-in-part of Ser. No. 595,585, Oct. 11, 1990, Pat. No. 5,159,960.

[51] Int. Cl.⁵ .......................... B65B 3/06; B65G 59/02
[52] U.S. Cl. ............................. 141/1; 141/9;
  141/169; 141/170; 141/174; 141/103; 414/331;
  414/417; 414/791.7
[58] Field of Search .................. 141/1, 9, 129, 168,
  141/169, 170, 174, 176, 103, 237; 414/331, 417,
  791.7, 907

[56] References Cited

U.S. PATENT DOCUMENTS

| | | | |
|---|---|---|---|
| 518,306 | 4/1894 | Clark | 141/237 |
| 1,292,994 | 2/1919 | Bayer. | |
| 1,872,686 | 8/1932 | Cundall | 141/170 |
| 2,516,998 | 8/1950 | Kimball et al. | |
| 2,673,567 | 3/1954 | Fruhling. | |
| 2,915,773 | 12/1959 | Whelan. | |
| 3,020,939 | 2/1962 | Donofrio | 141/169 |
| 3,079,936 | 3/1963 | Hockett et al. | |
| 3,159,164 | 12/1964 | McBrady. | |
| 3,270,783 | 9/1966 | Hughes | 141/1 |
| 3,533,453 | 10/1970 | Eberle | 141/1 |
| 3,545,024 | 12/1970 | Randrup. | |
| 3,612,299 | 10/1971 | Shaw et al. | 414/791.7 |
| 3,674,060 | 7/1972 | Ruckberg. | |
| 3,985,096 | 10/1976 | Guimbretiere. | |
| 4,055,202 | 10/1977 | Greene. | |
| 4,061,152 | 12/1977 | Banbunovic. | |
| 4,270,584 | 6/1981 | Von Lieshout. | |
| 4,325,775 | 4/1982 | Moeller. | |
| 4,411,295 | 10/1983 | Nutter. | |
| 4,544,059 | 10/1985 | Mernoe. | |
| 4,603,896 | 8/1986 | Yasseur et al. | 414/791.7 |
| 4,621,969 | 11/1986 | Berghäll | 414/331 |
| 4,683,009 | 7/1987 | Shriver. | |
| 4,715,920 | 12/1987 | Ruppman et al. | |
| 4,779,634 | 10/1988 | Gutierrez et al. | |
| 4,962,843 | 10/1990 | Ouellette. | |
| 5,159,960 | 11/1992 | Pringle | 141/1 |

Primary Examiner—William A. Cuchlinski, Jr.
Assistant Examiner—G. Bradley Bennett
Attorney, Agent, or Firm—Eckert Seamans Cherin & Mellott

[57] ABSTRACT

Open containers having uniform dimensions are handled in a group for loading of ballast and/or for filling with container contents prior to sealing. The containers are provided upright on a substantially unobstructed surface and are forced into a substantially contiguous array by inward pressure on the array in at least one direction perpendicular to the longitudinal axes of the containers. Compressing the array of containers in this manner moves the containers into immediately contiguous regular positions in a resulting container array, which is aligned in registry with dispensing orifices. One or more movable sweep arms which may cooperate with fixed walls laterally bounding the conveying surface are used to compress the array. The sweep arms and the fixed walls are scalloped to form receptacles defining a closest possible positioning of the peripheral containers, which during compression cause adjacent inward containers to become correctly positioned. Nozzles coupled to a material dispenser (e.g., for ballast water when running lightweight PET containers) are aligned to the resulting array and are opened momentarily or selectively to discharge into the containers.

20 Claims, 5 Drawing Sheets

CONTAINER FILLER, ESPECIALLY FOR BALLAST HAVING CONTOURED SWEEP FOR ARRAYING CONTAINERS

CROSS REFERENCE TO RELATED APPLICATION

This is a continuation-in-part of U.S. patent application Ser. No. 07/595,585, filed Oct. 11, 1990, now U.S. Pat. No. 5,159,960.

BACKGROUND OF THE INVENTION

1. Field of the Invention

This invention relates to the field of grouped container handling, for example in bottling plants. In particular the invention provides an improvement in handling systems intended to process a plurality of containers while the containers are arranged in an X-Y array in alignment with operative elements of the handling system. The array of operative elements can be, for example, an X-Y array of nozzles of a ballast loader, container filling machine, cleaning apparatus or the like, a filling or capping apparatus having a plurality of stationary or movable heads, or other stationary or movably arranged devices which operate on containers expected to be located at predetermined positions in an array. The invention provides an apparatus for engaging the periphery of an X-Y array of containers so as to force them into a regular array notwithstanding gaps in the array.

2. Prior Art

Most container processing techniques require that the containers be positioned serially in line, where they are engaged by devices which clean, fill and seal the containers. The containers generally are converted from a bulk storage configuration to a serial line for processing. For example, a serial line of containers can be fed through a carousel-type filling machine having a number of heads which individually engage single containers and fill them as the containers move around the carousel.

In a conventional bottling system, empty containers are supplied on pallets wherein containers are stacked in an X-Y array over one another with interleaved panels supporting each level or rank on the lower level(s). A depalletizer receives the pallet and raises the pallet until the topmost level or rank of containers is coplanar with a receiving platform. The rank of containers is then pushed laterally onto the receiving platform.

Where the containers are to be converted to a serial line as described, the receiving platform leads to a funnel-like path wherein successive decreases in width force the containers into single file, from which the containers proceed one after another through continuously operating processing steps. This funnel-like section serves to accumulate the containers because each rank from the depalletizer requires a certain time to be converted from an X-Y array of containers to a single file, and theoretically, the next rank is supplied just as the previous rank is exhausted.

The containers in the single file are then carried by a conveyor typically having one or more endless loops of conveyor belt, horizontally attached link plates, or rollers, which define a moving horizontal platform for supporting the containers while advancing the containers to the next processing station. Each container simply rests on a horizontal surface which is moved to advance the container.

The bottling system preferably runs continuously. For maximum production it is necessary to avoid both stoppages of the line and gaps in the single file progression of containers. In addition to the lost production caused by gaps in the line, the containers to some extent support one another upright as they are moved along the conveyor. Where gaps occur, the containers leading and trailing the gap lack support from adjacent containers and more easily fall over. When a container falls over, the entire line may become jammed. This is a particular problem with lightweight plastic containers such as polyethylene terephthalate (PET) containers. These plastic containers are thin, light and durable, which are obvious advantages in reduction of shipping weight, ability to use lighter production equipment and the like. However, the containers are so lightweight as to be unstable when carried on a horizontal conveyor surface.

In order to avoid jamming of bottling lines when running lightweight plastic containers, the lines are run substantially more slowly than a comparable line running glass containers, which are heavier and therefore more stable. Even at slower rates of throughput, the plastic containers tend to fall over much more frequently than do glass containers, and more workers are needed to correct recurrent jamming and resume proper operation of the line. The plastic containers are so lightweight that minor breezes in the plant, e.g., due to opening of an exterior door, can cause disruptive fallovers.

Plastic containers are used for a wide variety of products. Standard container capacities, for example for beverage containers, are 16 ounce, 20 ounce, 1 liter and 2 liter. Of course other sizes are also possible and in standard use for various products. The containers vary not only in size but also in shape. The containers can be cylindrical or tapered, round, square or oval in cross section. Some forms of plastic containers are relatively tall and thus are easily knocked over by uneven conveyor passages, impacts, or by breezes in the bottling plant.

Plastic containers have been made with an excess of plastic at the bottom, which helps to preclude fallover. A "petaloid" form of container has a scalloped bottom with radially oriented folds which increase the rigidity of the container at the bottom and also provide additional weight at the bottom due to the additional material at the fold. Another form of container is the "champagne" type, which has an inward dome in the bottom. Some containers are supplied with an outer reinforcing cup that is bonded to the outside of the container at the bottom. The reinforcing cup is generally made of less expensive plastic than PET, is opaque rather than clear, and defines a bottom weight that makes the empty container more stable when placed on its bottom. The reinforcing cup, however, conceals the content at the bottom, requires additional manufacturing steps, and renders the container unacceptable for recycling into new PET material. Plastic containers are not recycled by cleaning and re-use as are glass containers. Instead, they are shredded and the material is molded into new containers or other products.

According to one method intended to reduce fallovers, plastic containers are not carried solely on horizontal support surfaces, but instead (or in addition) are carried by a structure having rails or flanges that face inwardly near the neck of the container. The containers are provided with a circumferential bead or flange at the neck, that rests on the conveyor rails to support the container. In an embodiment known as an Airveyor, the containers are supported entirely by the rails, and blasts of air are used to propel the containers along the conveyor path. While such systems are useful, it is desirable to provide a handling arrangement that does not require added container material, processing requirements and/or conveyor structure.

For handling lightweight containers at increased production speeds in processes such as bottling plants, U.S. Pat. No. 5,159,960 discloses a ballast loading system which renders lightweight containers more stable temporarily, without increasing the cost of container production and materials, and which permits the containers to be run as fast as stable glass containers on simple horizontal supporting conveyors. This is accomplished by adding a limited quantity of water or other ballast, rendering the containers bottom-heavy and stable, at least from a depalletizing step to a cleaning operation at which the ballast is emptied.

Empty containers from the depalletizer are arranged in an upright orientation and in an X-Y array. The array is positioned below a dispenser having an X-Y array of nozzles coupled to a supply of ballast such as a tank of water coupled in common to all the nozzles. A limited quantity of ballast is dispensed into the containers by momentary operation of the nozzles, or alternatively the containers move through a spray which generally encompasses the containers, the latter producing overspray which must be collected. Having been loaded with a limited quantity of ballast, e.g., as little as three to ten percent of the container volume, or less, the containers are stable and can be moved along a conveyor for further processing. The ballast is preferably water and can be removed after the containers have been moved on the conveyor, for example by inverting the containers to drain the ballast by gravity. In a bottling plant the typical rinsing apparatus can be used to empty the containers of ballast in this manner. This arrangement works quite well with polyethylene terephthalate (PET) containers, and precludes many of the problems of container fallover and container jamming that are associated with very lightweight containers.

It is desirable in a ballast loader having an array of nozzles to operate the nozzles only when the containers are in place to be filled, so as to avoid the need to collect dispensed ballast material which misses the openings at the top of the containers. The containers can be moved in an array to the nozzles, whereupon a photocell, limit switch or other sensor triggers momentary operation of the ballast dispenser. The nozzles emit into the containers which are in place, but may miss or only partly fill containers which are at least slightly out of position.

Typically, in advancing an X-Y array of containers, a sweep bar urges the containers forward from behind the array. Assuming some resistance, containers having a round cross section nest against one another in an alternating pattern. Frequently, however, the array of containers which is nested in this manner has voids. In a gang dispensing machine which is not assured of accurately and exclusively dispensing into correctly positioned containers, and which emits water ballast, the result is simply excess water to be collected. In a filling machine for material contents to be loaded into containers, the problem is more serious.

It is possible to ensure that containers are in correct position by defining parallel paths for the containers using guide structures which force the containers into a number of single files. Such a structure is expensive and increases the tendency of containers to fall over, especially when being forced into the serial paths.

U.S. Pat. No. 4,055,202—Greene discloses a gang filling machine intended to operate on an X-Y array of containers, in this case to load the containers with their ultimate contents. In order to ensure that the containers occupy correct positions in the X-Y array, the containers are held in a compartmented case defining correct X-Y positions for each container. It is unclear how the containers are loaded into the compartmented case, and presumably the containers are loaded individually, being dropped along their longitudinal axes into the compartments. In order to ensure that the filling machine does not emit contents into an unoccupied position, the filling machine has valves operable to open by contact with the containers or to remain closed when no container is encountered. This arrangement avoids the dual problems of correct positioning and gapping of array locations. In order to address these problems, however, a relatively complicated machine is required which incorporates selectively operable valves, relative axial movement of the containers into the compartments, axial movement of the valves over a substantial length of stroke, and a structure with separate compartments for individual positioning of each container.

It would be desirable in a gang filling machine such as a ballast dispenser or content filling machine to ensure that the containers occupy the desired positions without placing the containers in individual receptacles, which is cumbersome. It would also be desirable to enable selective operation of valves using a relatively shorter stroke, i.e., which need not include sufficient displacement along the stroke to engage the outer surface of the container.

According to the invention, an array of containers is engaged from the outside via one or more contact bars which includes scallops operable to engage and correctly position the containers along a periphery of the array. Means are provided to urge the scalloped contact bar toward the array. The peripheral containers are thus forcibly aligned to the scallops. Advancing the contact bar extends the alignment of the containers inwardly toward the middle of the array, as the aligned peripheral rows and/or columns engage and align the next inward row and/or column, proceeding inwardly. At a sufficient advance, the containers are arranged in direct contiguous contact throughout the array. Based on the looseness of the original spacing of the containers, there is a possibility that the array may include voids. However, the containers which are engaged in this manner substantially all occupy correct array positions.

The invention is quite apt for a ballast filling machine having an array of ballast dispensing nozzles. The nozzles can be operated momentarily, with a minimal loss of misdirected ballast material, i.e., lost ballast material being limited to the voids. The invention is also apt for a gang filling machine comprising selectively operable valves. Unlike Greene, where X-Y positioning is provided using relative displacement along the container axes of the containers, the means defining their compartments and/or the selectively operable valves, the invention enables valve operation along a very short stroke.

SUMMARY OF THE INVENTION

It is still another object of the invention to provide an apparatus for arranging containers in an array such that each container in the array is in registration with a dispensing orifice.

These and other objects are accomplished by the method and apparatus for handling containers according to the invention Open containers having uniform dimensions are handled in a group for loading of ballast and/or for filling with container contents prior to sealing. The containers are provided upright on a substantially unobstructed surface and are forced into a substantially contiguous array by inward pressure on the array in at least one direction perpendicular to the longitudinal axes of the containers. Compressing the array of containers in this manner moves the containers into immediately contiguous regular positions in a resulting container array, which is aligned in registry with dispensing orifices. One or more movable sweep arms which may cooperate with fixed walls laterally bounding the conveying surface are used to compress the array. The sweep arms and the fixed walls are scalloped to form receptacles defining a closest possible positioning of the peripheral containers, which during compression cause adjacent inward containers to become correctly positioned. Nozzles coupled to a material dispenser (e.g., for ballast water when running lightweight PET containers) are aligned to the resulting array and are opened momentarily or selectively to discharge into the containers.

Preferably, the array is engaged along at least two opposed sides with bars having a contour complementary with immediately adjacent (i.e., laterally abutting) containers, either or both of which can be movable toward the array (to compress the array) and away from the array (to release the containers to advance further along the handling process). The array can be engaged along three, or preferably four sides, using a rectangular or square sweep bar arrangement.

The sweep bars can be arranged to compress the containers under the dispensing orifices. Alternatively, the containers can be advanced into registry with the dispensing orifices while held in the array or the dispensing orifices can be advanced into registry with the containers. The dispensing orifices can be opened momentarily during registry of the containers and the orifices, for a sufficient time to fill the containers to a desired level.

Momentary opening of the orifices is appropriate, for example, when the dispensed material is a ballast material such as water, which can be collected if it misses its mark, namely the open tops of the containers. Alternatively, the orifices can include selectively operable valves coupled to a supply of material to be dispensed. The valves are arranged to open when a container is sensed in registry with a valve, thus preventing dispensing of material into a void in the array. For example, the dispensing orifices can have contact-operable valves mounted for relative movement toward and away from the containers, the valves opening when a container is in position to press the valve open. The dispensing orifices can be arranged in one or more lines registered to the containers in the array, or preferably, substantially all the array is simultaneously filled in a gang filling arrangement.

The invention is particularly applicable to gang filling containers such as polyethylene terephthalate (PET) with ballast, for example associated with a depalletizer operable to move the containers from successive ranks or levels on a pallet, onto a horizontal supporting surface leading into a filling process. A limited quantity of ballast is added, e.g., water in the amount of 3 to 10% of the container volume or 50 to 100% of the empty container weight. This substantially improves the stability of the PET containers and allows high production speeds without undue container fall-overs. The ballast is readily removed at the usual container rinsing machine which processes the containers before filling, including by inverting the containers, whereupon the ballast is removed.

BRIEF DESCRIPTION OF THE DRAWINGS

The invention is described herein with reference to a number of exemplary embodiments but is capable of embodiment in other specific forms in accordance with the invention as defined in the appended claims. In the drawings.

DETAILED DESCRIPTION OF THE PREFERRED EMBODIMENTS

Figure 1:
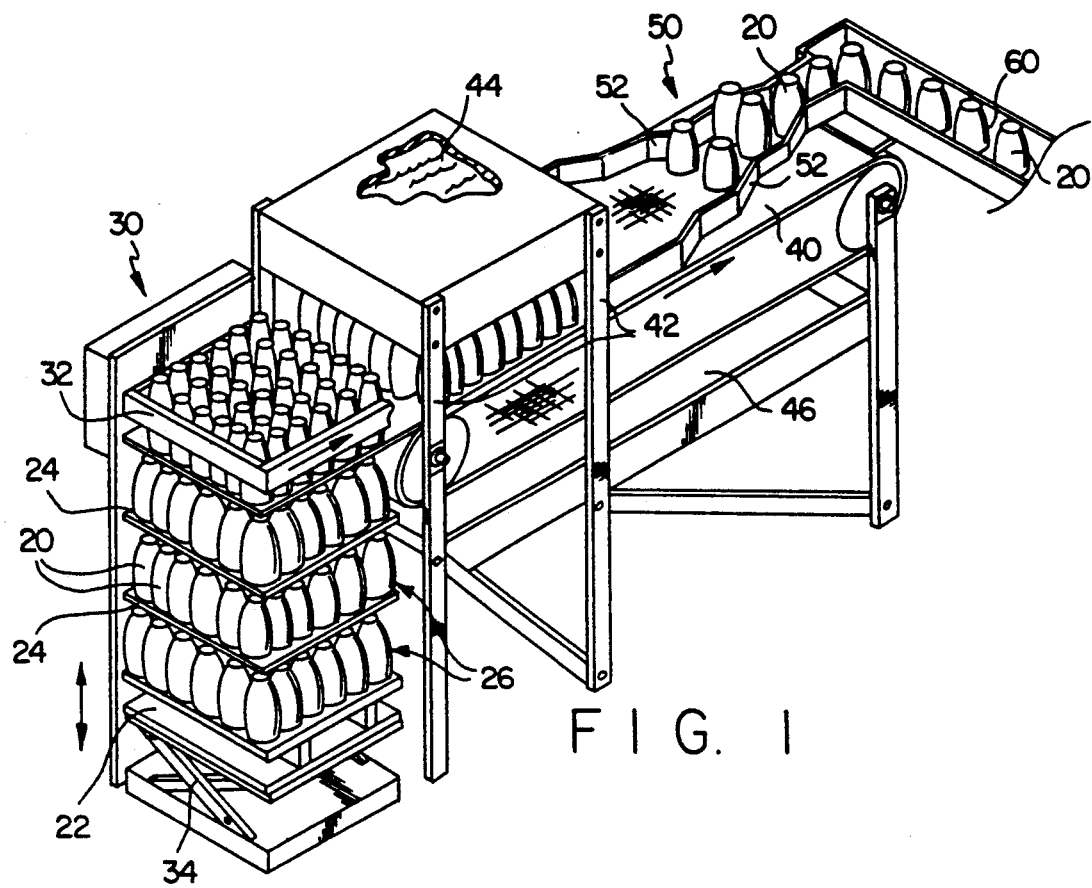
FIG. 1 is a perspective view of an initial section of a container handling process according to the invention, with a depalletizer leading to a horizontal conveyor.

The invention provides a method for handling lightweight open containers, particularly plastic containers such as beverage containers, but also including other forms of empty containers and the like which are subject to falling over when carried on a conveyor The containers are arranged in an upright orientation, a quantity of ballast is dispensed into the containers, and thereafter while moving along a conveyor, the ballast keeps the containers stable. After serving its stabilizing function, the ballast is removed, preferably simply by inverting the containers at a container rinser FIG. 1 illustrates the initial section of a container processing plant, in particular a bottling plant as may be typically used in marketing beverages in 16 or 20 fluid ounce or 1 or 2 liter containers. The containers can be polyethylene terephthalate (PET) containers, which are quite light in weight. The containers in general pass through stages of depalletizing, ballast loading, rinsing (which includes inverting the containers and thereby unloading the ballast), filling and capping The depalletizer 30 receives a pallet 22 of containers 20 or the like. The containers 20 are supplied in a plurality of horizontal levels or ranks 26. For example, each rank may have 300 or more containers, standing upright on their bottoms on a divider panel 24. The depalletizer 30 includes a vertical indexing drive means 34 operable to raise the pallet 22 in increments equal to the vertical height of a rank 26 and its base panel 24. After each index the uppermost rank is disposed at the same level as a conveyor 40. A sweep bar or housing 32 encloses around the periphery of the uppermost rank, and when the uppermost rank is in position the sweep bar 32 advances toward and over conveyor 40 to move the peripherally enclosed containers onto the conveyor 40. Conveyor 40 can be arranged to index synchronously with advance of the sweep bar or can be continuously moving. Conveyor 40 in the embodiment shown defines an endless loop, however, it can be made up in sections of smaller endless loops. The conveyor can have a continuous flexible mesh or the like, or can be made of linked plates. At least the section in the area of the ballast loading apparatus 160 is foraminous or arranged with gaps, such that spillage of the ballast can fall through to a receptacle therefor.

The ballast can be loaded by passing the upright containers through a continuous downward spray. However, this is somewhat wasteful of water and/or pumping capacity Each rank of containers at the depalletizing stage in processing is arranged in an orderly fashion, with the containers disposed in a regular X-Y array. The ballast loader 160 accordingly preferably has dispensing orifices for each position in the array, operated briefly when the containers are aligned with the dispensing orifices. When the rank 26 advances to a point in registry with the ballast loader, which can be timed or sensed, the ballast loader is activated and a quantity of ballast, preferably clean water, is dispensed into each of the containers in the array. The added ballast renders the containers substantially more bottom heavy and stable, reducing the tendency of the containers to fall over. Without the added ballast the containers would often fall over, particularly at the leading and trailing lines in the rank, where no neighboring container is disposed to help keep the outermost containers upright. Without ballast, it is also sometimes the case that an inwardly falling container will cause a whole line of containers to fall in a domino effect.

It is also possible to add ballast to a limited number of containers in a rank, although this is not preferred. For example, ballast could be added to the peripheral containers only, thus defining a stable wall of containers enclosing the unstable internal containers. Ballast could also be added to every other container, etc. However, since the relative positions of the containers is not retained throughout the process, it is preferred that all the containers be loaded with ballast.

The containers now moving in a stable rank along conveyor 40 are converted into a row arrangement to be carried further through the process along conveyor 60. There are a number of possibilities for converting an X-Y array into a row. In the embodiment illustrated in FIG. 1, for example, the lateral sidewalls enclosing conveyor 40 are narrowed incrementally, forcing the containers 20 to merge into a row for receipt on single file conveyor 60. It will be appreciated that such a sequence of obstructions would frequently cause containers to fall over, particularly if the conveyor is moving at a substantial speed. The ballast in the containers renders the containers stable and allows them to be advanced at a substantial speed without undue fallovers.

Figure 2:
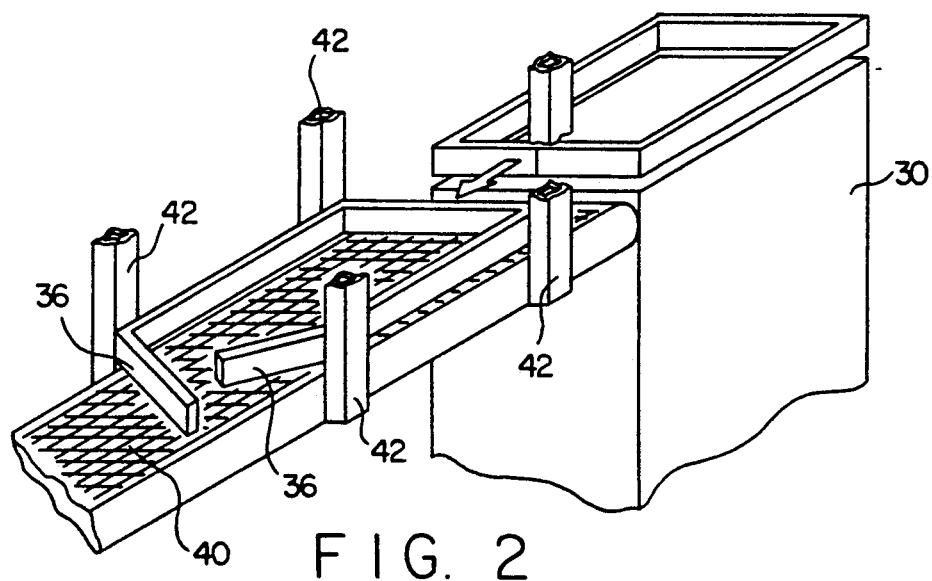
FIG. 2 is a perspective view from an opposite direction, with the depalletizer shown generally and the ballast reservoir broken away.

FIG. 2 illustrates an embodiment including one or more gates 36 for retaining the rank in position at the dispensing station. The gates 36 can by pivotable vertically or horizontally, for example being mounted on supports 42 for the ballast reservoir 44. An air cylinder (not shown) can advance and retract the gates for each ballast loading cycle.

Figure 3:
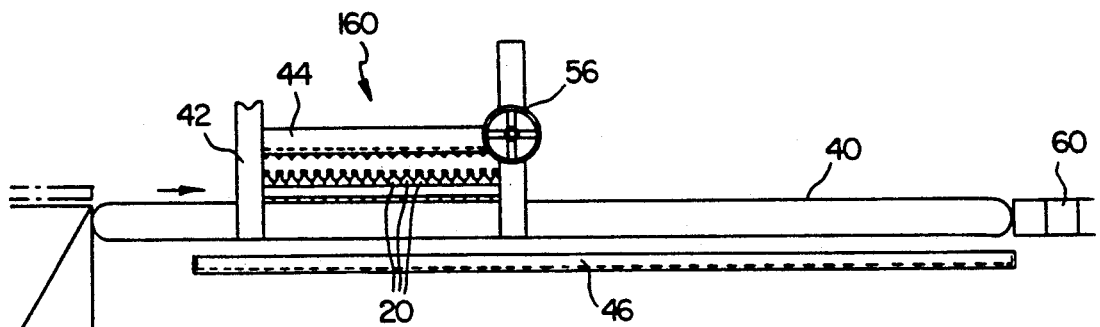
FIG. 3 is an elevation view thereof.

As shown in FIG. 3, the ballast reservoir 44 can be vertically adjustable, for example via handwheel 56. This enables the orifices in the reservoir to be placed immediately over the open tops of the containers. The handwheel can drive a rack and pinion positioning mechanism or a winch for lifting and lowering the reservoir. Suitable locking means fix the reservoir at the desired position.

Conveyor 60 (see FIG. 1) advances the containers, preferably in single file, to a rinsing apparatus 110. The incoming conveyor 40 can be positioned at the height of the highest rank of containers in a pallet, and the conveyor path downstream along the container path can include a decrease in elevation via inclined conveyor section 70. This enables mounting of the rinsing apparatus and filler/capper at floor level. A suitable inclined conveyor is available under the tradename Lowerlator.

Figure 4:
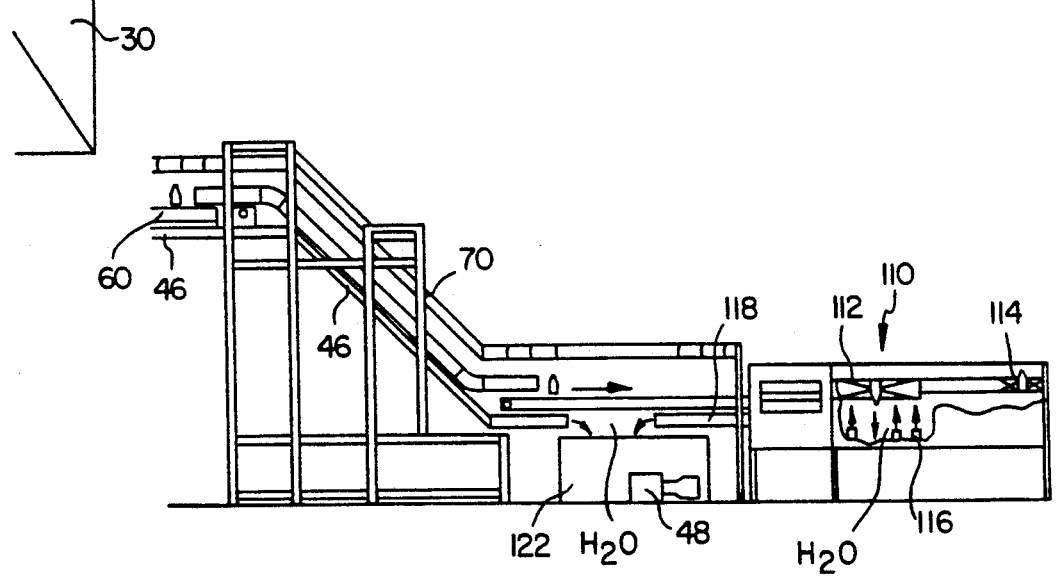
FIG. 4 is an elevation view of a further section in the handling process, leading to a container rinser.

The rinsing apparatus 110 as shown in FIG. 4 inverts the containers initially, thereby unloading the ballast via gravity, sprays a rinse solution (preferably also clean water) into each container, and after a draining time replaces the container upright. During passage from the ballast loading apparatus 160 to the rinsing apparatus 110, the containers are stable, and this is achieved without adding to the material or expense of the containers. The ballast system has a minimal effect on the bottling process as a whole. Inasmuch as the containers are to be rinsed in any case, the ballast does not require additional steps to remove or further clean the container, in addition to that already undertaken in the known rinser.

Overspray and drained rinse solution or ballast is preferably recovered. In the area of ballast loader 160 a catch basin 46 defining a wide channel under conveyor 40 receives overspray and the like from the ballast loader. The channel can extend continuously along the length of the inclined section 70 to the rinsing apparatus to catch ballast dripping from the outside of the containers. Alternatively, the catch basin 46 can be connected by suitable conduits to the ballast storage reservoir 44 with a pump provided for moving the collected ballast fluid or material back to the ballast dispenser. In the embodiment shown in FIGS. 3 and 4, the catch basin 46 is arranged to drain into the same reservoir 122 used by the rinser 110. A pump 48 moves the ballast material back to the reservoir 44 and also provides pressurized water for rinser heads 116. Pump 48 or a valve along the path from pump 48 to the reservoir 44 can be operable under control of a level or pressure sensor at reservoir 44 (not shown), for maintaining a predetermined level or pressure of ballast fluid in the reservoir.

The rinser 110 also includes a catch basin 118 draining into a tank 122, collecting overspray and drainage, and recycling the solution. The preferred solution for both ballast and rinsing is clean water, and suitable filtering and/or water purification apparatus can be associated with the water handling systems for both ballast and rinsing such that the water remains clean for at least a number of ballast or rinsing cycles. Of course it is also possible to use fresh water for ballast and/or rinsing and simply to discard the water after use.

The rinser 110 receives containers from the inclined conveyor section 70 and inverts the containers via an inverting guideway 112 leading to a section of conveyor at which the containers are moved while inverted. The rinse spray and drainage collection means are disposed at this section. A further inverting guideway 114 returns the containers to the upright orientation for filling and capping at an apparatus (not shown) placed downstream of the rinser along the container path, in a conventional manner. Inverting guideways and filler/capper apparatus are known in the art per se. However, the operational speed of conveyors, rinsers and filler/capper apparatus has been limited as applied to lightweight containers due to problems with handling the containers in a manner that is not unduly subject to jamming.

The preferred containers (e.g., containers) essentially comprise polyethylene terephthalate, which is lightweight and durable. Water ballast dispensed into the containers in an amount sufficient to fill the containers to 0.5 to 1.5 inches from the bottom is normally sufficient to enable substantially increased production speeds, approaching the speeds at which glass containers can be handled. Accordingly, added ballast in an amount about 3 to 10% of a total volume of the containers is added at dispenser 160. Whereas empty plastic containers can be handled on horizontal support conveyors at typical rates of 450 containers per minute, containers including water ballast can be handled at 1,000 to 1,600 containers per minute without undue jamming. The preferred quantities of ballast in standard size beverage containers, for example, is 1.5 ounce for a 16 or 20 ounce container, 2.0 ounces for a one liter container and 2.5 ounces for a two liter container. Comparable ballast quantities can be used in containers and containers of other types, not limited to beverage containers but also for other consumer products and the like.

The ballast can be dispensed into the containers according to a number of specific techniques and apparatus. Preferably the ballast is dispensed into a number of the containers simultaneously, however it is also possible to dispense the ballast by sensing the position of individual containers and operating a valve or the like to dispense the ballast into each container as it passes the valve. Another possibility is to operate the ballast dispenser continuously, dispensing spray generally and at a flow rate which is sufficient to accumulate the required amount of ballast in each container over to the time in which the containers pass the continuously operating dispenser. In that case the ballast can be dispensed from one or more wide pattern spray heads directed downwardly over the path of the containers along conveyor 40.

Figure 5:
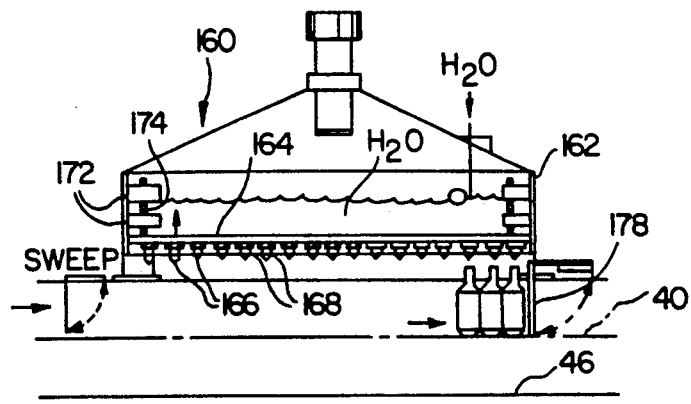
FIG. 5 is a section view showing a preferred ballast dispenser according to the invention.
Figure 6:
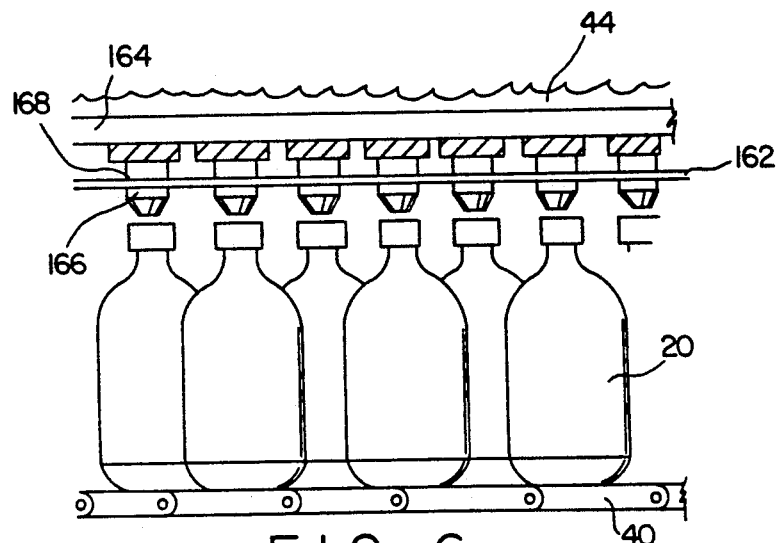
FIG. 6 is a partial elevation view of the ballast dispenser.
Figure 7:
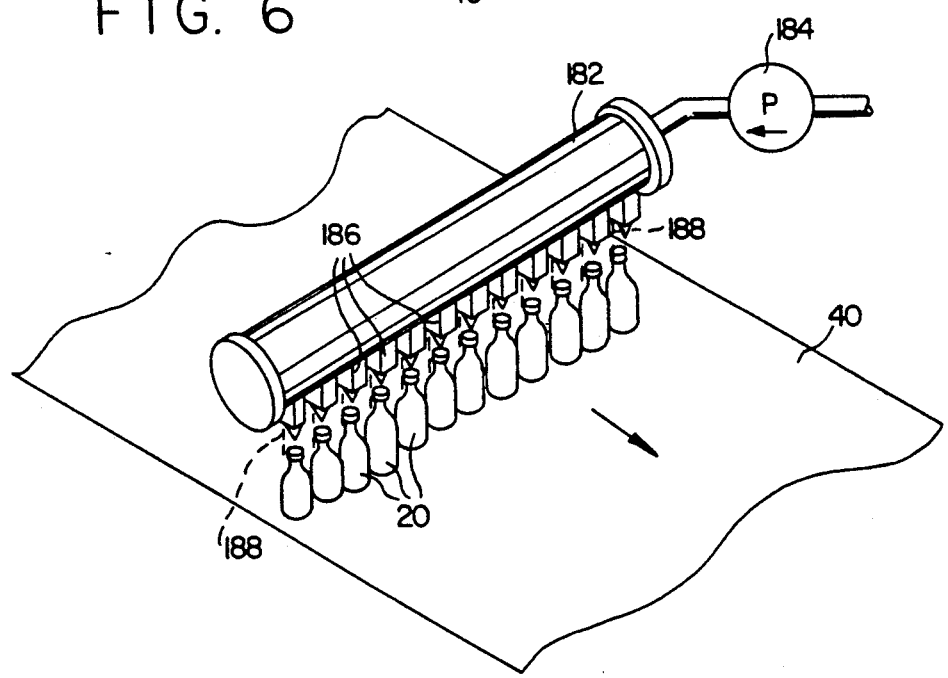
FIG. 7 is a perspective view of a ballast dispenser according to an alternative embodiment.

Preferably the ballast is dispensed into a group of the containers from a rank 26 from a pallet as shown in FIGS. 1, 3, 5 and 6, before forming the containers into a row. The dispenser can simultaneously load ballast in an X-Y array of the containers, for example an entire rank 26. Alternatively, the dispenser can simultaneously load a lateral line of the containers in a rank as shown in FIG. 7.

For dispensing ballast into a line or rank, a plurality of orifices in the lower wall of a reservoir or pressurized ballast storage vessel can be provided. Means can be provided for opening a plurality of valves as the containers in a rank pass the valves. The containers in the pallet are placed directly against one another and thus define a regular array. The depalletizer sweep places the containers on the conveyor 40 in a predictable array, and the orifices or valves in the dispenser 160 are aligned to the array, as shown in FIGS. 5 and 6. Apart from the depalletizer a gate 36 can be placed at the end of the dispenser 160 along the path of conveyor 40 such that the containers queue against the gate and assume a regular array, as shown in FIG. 2. This array can be a linear array (FIG. 7) or a matrix array (FIG. 1). The containers can be stopped for ballast loading or allowed to advance continuously. For retaining alignment of the ballast orifices and moving containers, an indexing or tracking drive (not shown) can be associated with the dispenser 160 such that the valves or orifices dispensing the ballast will track moving containers on the conveyor 40, to direct the ballast into the open tops of the containers for a sufficient time to load the containers with the required amount of ballast.

According to the invention, the containers received from the depalletizer are packed in a dense array as a preliminary step, in order to align the containers with the dispensing orifices of the ballast dispenser following the depalletizer during handling of the containers. The containers can be packed in the same manner to facilitate gang-filling of the containers with their ultimate contents, prior to sealing the container. Furthermore, steps such as capping can benefit from alignment of the containers in a regular array, wherein each container occupies a predetermined position. In connection with filling with ballast, registration of the containers to the same array positions as the dispensing nozzles prevents overspray of the ballast, which otherwise must be collected. It is generally advisable in connection with content filling to include a selectively operable valve with each dispensing orifice, such that the relatively more-valuable contents are not wasted. A selectively operable valve arrangement is disclosed for example, in U.S. Pat. No. 4,055,202—Greene, which is hereby incorporated. By using a selectively operable valve for each orifice, the dispensing means does not discharge into any array position which has a void.

In order to align the containers, the array of upright containers, which occupies a loose X-Y array, is compressed laterally inwardly. Particularly for containers which are round in cross section, but also for some other container shapes, compressing the array of containers forces the containers into one of a number of regularly spaced positions in an X-Y array. Some of the positions may remain empty (i.e., as voids in the array) when the container array is compressed to the point that the array is stable due to the abutment of the containers and cannot be compressed further. However, except for voids which are larger than two or three adjacent positions, all the containers occupy one of the regular array positions. Normally, if a void of three or more adjacent containers exists, the array can be compressed further, causing neighboring containers to shift in the array to occupy the void. In this manner, by compressing the array, all or most of the containers can be positioned in registry to receive material from dispensing nozzles in registry with the array, without waste, overspray and the like.

For round containers, the array preferably defines alternating lines of laterally abutting containers, wherein the longitudinal centerline or axis of a given container in one line is centered between the longitudinal centerlines of the two containers in the next adjacent line which abut the given container. To compress the array into this configuration, according to the invention one or more lateral constraining structures is provided, and arranged to move inwardly toward the array from at least one side.

Figure 8:
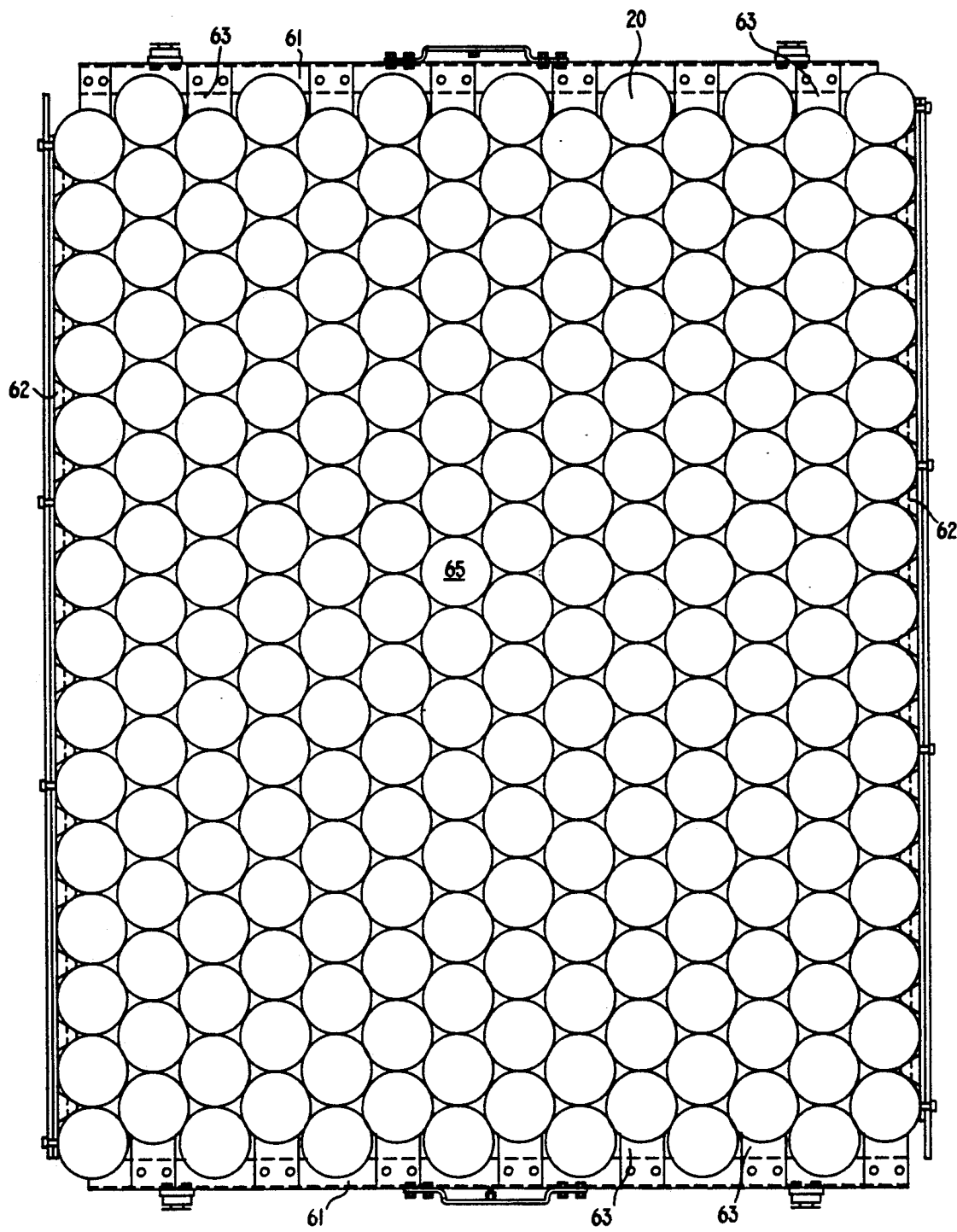
FIG. 8 is a top plan view of an array of containers and a means for arranging the array according to the invention.
Figure 9A:
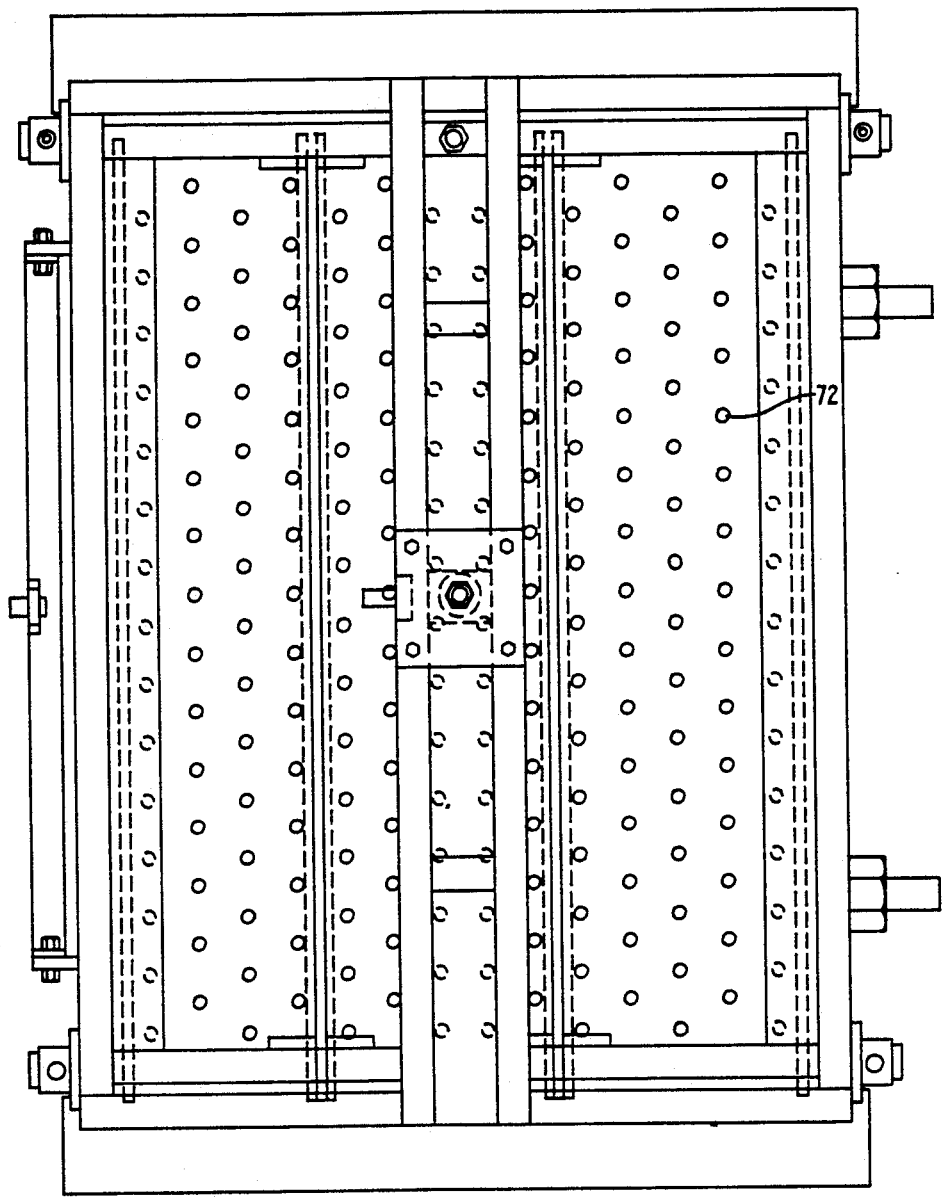
FIG. 9 is a top plan view of a ballast dispensing apparatus for an array of containers, and templates for arranging the array.
Figure 9B:
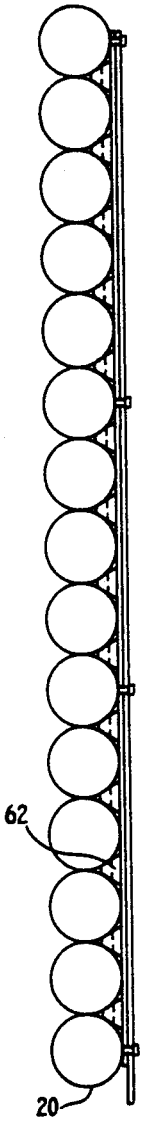
Figure 9C:
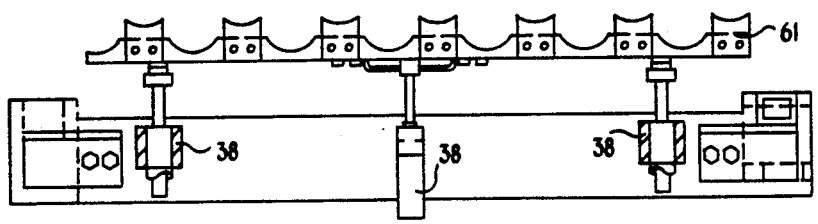

Preferably, the lateral constraining structures include at least two sweep bars 32 having a scalloped or similar contour defining receptacles complementary to a line of containers in a compressed array. Referring to FIGS. 8 and 9, for the containers 20 having uniform dimensions, and in this case round cross sections, a contiguous array 65 of the containers 20 is achieved using two sets of opposed constraints 61, 62, which bear laterally inwardly on the containers to achieve the regular array shown. The opposed constraints 61 or 62 can be movable independently, or one of the opposed members can be fixed while the other is movable. The array is fully packed, with one of the containers 20 in every available space.

For round containers, two opposite sides of the array, namely those engaged by constraints 62, define straight lines of containers. Whereas the alternating lines of containers nest at the spaces between the containers in these lines, the other two opposed constraints 61 are arranged to define alternating positions for the alternating lines. This can be accomplished as shown by providing constraints 61 with protruding supports 63 which are attached to the constraint 61 and together with depressions defined between the supports 63, which can be supplemented by rounded contours as shown, define a surface which is complementary to the packed containers in the array.

The constraint structures 62, which bear against straight lines of containers, can be provided with regularly spaced protrusions fitting between the containers in the array. In the embodiment shown, the protrusions on opposite sides of the array align with one another. It is also possible to arrange for the opposite side to engage alternate lines of bottles, in which case the protrusions on one side 62 are interleaved between those on the opposite side, as needed to engage and alternating row or column.

It will be appreciated that the array shown in FIG. 8 is structurally secure because the containers nest in abutment at their minimum spacing. However, it may occur that one or more positions in the array are not filled by one of the containers 20 due to lack of a sufficient number of containers, interference between containers, etc. The arranging means provides a substantially contiguous array which is advantageous for achieving registration of each of the containers 20 with one of the ballast dispensing orifices 72.

As a loose array of containers is compressed using constraining structures as shown, the containers at the periphery naturally align between the protrusions which extend inwardly from constraining structures 61, 62 toward the array. Having engaged one row or column of containers against the constraints, the engaged containers then define a supported protruding surface which engages the next adjacent containers proceeding inwardly from the periphery to the internal area of the array. In particular, the next row of containers is engaged, positioned and structurally supported between the containers on the next outward row or column. As the array of containers is compressed, the containers are all forced to assume a position at the regular positioning and spacing which is defined by the array.

The array is stable in the event of isolated voids which are only one container in width, because the neighboring containers are supported by the containers which abut them. Should a larger void develop during compression of the array, such as three adjacent containers, the pressure of the constraining structures 61, 62 causes the containers adjacent the void to shift to fill the voids. This occurs due to lack of structural support to resist displacement due to lateral compression, which lack of support is inherent in a localized void of three or more containers. By compressing the array, most or all of the containers are thus positioned in a known pattern.

The dispensing orifices are of course aligned to the pattern. Having positioned the containers in this manner, the array is moved laterally into registry with the dispensing orifices, or vice versa, or both. The orifices are thereby aligned in registry with the containers and discharge into the containers.

As shown in FIG. 8, the array 65 has a perimeter 16 defining a profile, and the means for arranging includes at least one template 61, 62 having a shape corresponding to the profile. In a preferred embodiment as shown, the means for arranging includes opposed pairs of the templates 61, 62 which define a boundary for the array 65. The templates 61, 62 are transversely movable toward and away from the array to enclose the uppermost rank 26 of the containers 20 and guide the containers into a closely-fitting array. The templates are movable by, for example, hydraulic or pneumatic actuators 38, as shown in FIG. 9, having controls which limit forces exerted by the actuators in order to prevent crushing of the containers 20. For example, a spring biased limit switch (not shown) or the like can be used to limit the pressure exerted.

In the illustrated embodiment, the templates 61, 62 are dimensioned to accommodate an array having multiple rows of uniformly dimensioned round containers. Templates suitable for accommodating arrays having different arrangements and containers having different shapes can be envisioned by one skilled in the art and are within the scope of invention. For example, containers having regular polygonal cross sections (e.g., regular triangle, square, octagon, etc.) are readily positioned in this manner, preferably using template shapes that complement the container shapes when the array is compressed to the point that all the containers in a full array abut. Preferably, shapes characterized by sides arranged at right angles (e.g., squares, octagons) are engaged using four constraint structures or sweeps. Shapes having a different arrangement of sides (e.g., regular triangles) can be engaged with a different number of constraints (in that case three).

According to a preferred embodiment of the dispenser as shown in FIGS. 5 and 6, valves in the required array are defined by a plurality of openings or valve seats 168 in the bottom wall of the reservoir. The openings or valve seats 168 are controllably plugged by valve bodies 166 attached to a common support 164. The common support is displaced upwardly to simultaneously open the valves by lifting all the valve bodies 166 relative to the seats 168 at one time. A cam drive, air cylinder, electromagnetic (solenoid) drive or the like (not shown) can lift the common support 164, which is preferably slidably disposed via guide shafts 174 on support blocks 172 fixed on the inner wall of the reservoir. It is also possible to arrange the valves in reverse order, i.e., with a plate (e.g., the bottom wall of the reservoir) defining a plurality of valve seats and a framework supporting the valve bodies for upward and downward displacement relative to the plate from outside the reservoir.

An alternative embodiment of the invention is shown in FIG. 4. According to this embodiment, the ballast dispenser includes a pressurized fluid supply rather than a gravity feed supply as in FIG. 3. A pump 184 can be provided to pressurize the supply vessel 182, which has an array of solenoid valves 186 directed toward the containers. The valves 186 can be operated simultaneously, for example when a row or other array of containers abuts a gate (not shown in FIG. 7) along the conveyor. Alternatively, as indicated by the dashed lines in FIG. 7, each valve can be operable individually. A control photoeye is directed downwardly to detect the passing edge of a container 20, whereupon the valve is opened for a predetermined time, for example a time determined as a function of conveyor speed or a preset time controlled by a one shot timer or the like.

In addition to the foregoing valved dispensers, it is also possible as noted above to direct a steady spray of ballast water on the area occupied by the containers. In passing the area, each of the containers accumulates a quantity of ballast water, which can be pumped in a circuit between a collection reservoir under the container zone to the spray heads over the containers.

The invention as disclosed is an improved handling system for empty containers 20, the handling system having a conveyor 40 operable to support and transport the containers when rested thereon, and means 30 for delivering containers to the conveyor in an upright orientation The ballast dispensing apparatus 160 is operable to dispense a quantity of ballast into containers 20 in the upright orientation, the ballast stabilizing the containers when transported on the conveyor 40. A container inverting apparatus 112, 114 is associated with a destination 110 of the conveyor, and is operable to invert the containers 20 for removing the ballast. The containers are preferably containers, and the means for delivering the containers is a container depalletizer operable to remove a rank 26 of containers from a pallet and to funnel the rank of containers into a line. The ballast dispensing apparatus 160 can be disposed adjacent the depalletizer and operable to dispense ballast into a plurality of the containers prior to being funneled into the line. The container inverting apparatus is associated with a container rinser 110 operable to invert the containers and to rinse the containers via a rinse fluid directed upwardly into the inverted containers. The handling system can be a bottling system and further comprises a filling station.

In a preferred embodiment the ballast dispensing apparatus 160 includes a fluid supply 160, 182 with at least one valve 166, 168, 186 directed toward the containers 20 and means 164, 188 for opening the valve when a container is in position to receive the ballast. A plurality of valves 166, 168, 186 can be operable simultaneously to dispense the ballast into a plurality of containers at once. For this purpose, the fluid supply can include a reservoir 162 disposed over the containers and the valves are defined by a plurality of openings 168 in a reservoir wall controllably plugged by valve bodies 166 attached to a common support 164. Means 176, 174, 172 for displacing the common support simultaneously open the valves.

The invention having been disclosed, variations will now occur to persons skilled in the art and aware of this disclosure. The foregoing disclosure of preferred embodiments is not meant to be limiting, and reference should be made to the appended claims rather than the foregoing specification to assess the scope of the invention in which exclusive rights are claimed.

I claim:

1. A method for handling a plurality of open containers having uniform dimensions, each container defining a longitudinal axis, comprising the steps of:
   arranging the containers in an upright orientation with the axes of the containers parallel;
   arranging the containers in a substantially contiguous array by inward pressure on the array in at least one direction perpendicular to the axes, the containers occupying predetermined positions in a resulting container array as a result of contact with adjacent containers, positions of the containers in the resulting container array corresponding substantially to the substantially contiguous array;
   arranging a plurality of dispensing orifices coupled to a material supply, the dispensing orifices being aligned to the predetermined positions of a full complement of containers in the substantially contiguous array;
   dispensing a quantity of material from the material supply via at least a subset of the dispensing orifices aligned to containers present in the resulting container array.

2. The method according to claim 1, wherein the containers are arranged in said contiguous array by engaging at least one side of the array with a bar having a contour that is complementary to predetermined positions of containers along said at least one side, when in the substantially contiguous array.

3. The method according to claim 1, comprising engaging the array along at least two opposed sides with bars having said contour, and compressing the array between the bars to arrange the containers in the substantially contiguous array.

4. The method according to claim 3, comprising engaging the array along at least three sides, with bars having the contour.

5. The method according to claim 4, further comprising advancing at least one of the array and a means for dispensing the material relative to one another laterally of the axes, for arranging the containers in registry with the means for dispensing.

6. The method according to claim 5, further comprising operating the dispensing means momentarily during substantial registry of the containers and the means for dispensing.

7. The method according to claim 5, wherein said ballast is dispensed continuously during at least part of said advancing of the array.

8. The method according to claim 1, wherein said material is a ballast material, and wherein said dispensing adds a limited quantity of ballast material to the containers whereby the containers are rendered bottom-heavy.

9. The method according to claim 8, wherein said limited quantity of ballast consists essentially of three to ten percent of an internal volume of the containers.

10. The method according to claim 8, wherein said limited quantity of ballast amounts to 50 to 100% of a weight of the containers.

11. The method according to claim 1, wherein said material is a content material and wherein the dispensing substantially fills the containers.

12. The method according to claim 11, wherein the array has at least one void, and said dispensing step includes engaging with containers in the array a plurality of selectively openable valves coupled to a supply of the material, whereby material is dispensed into containers in the array and not into voids in the array.

13. The method according to claim 12, wherein the dispensing encompasses at least one line of the containers, the line being elongated substantially laterally of a direction of said advancing.

14. The method according to claim 12, wherein the dispensing encompasses substantially all containers in the resulting array of containers.

15. The method according to claim 1, wherein the material is dispensed from a plurality of orifices in an X-Y array corresponding to the resulting array.

16. The method according to claim 12, wherein the material is dispensed from a plurality of orifices in an X-Y array corresponding to the resulting array.

17. A container handling system for at least partially filling a group of containers, comprising:
a conveying surface, the conveying surface having a substantially unobstructed horizontal surface and defining a direction of advance of the containers along the handling system;
means for introducing a plurality of the containers onto the conveying surface in upright orientation;
at least one sweep bar and means for moving the sweep bar relative to the conveying surface, the sweep bar defining with the conveyor a progressively decreasing area for the containers when moved relative to the conveying surface, whereby movement of the sweep bar urges the containers into a substantially contiguous relationship defining a resulting array wherein the containers are regularly spaced in an X-Y array;
a dispensing means including a source of material and a plurality of orifices, the orifices being positioned in registry with the X-Y array and being operable at least momentarily for at least partially filling the containers, whereby the dispensing means dispenses substantially into the containers.

18. The container handling system according to claim 17, wherein the sweep bar is contoured to provide a plurality of receptacles for containers along a side of the resulting array.

19. The container handling system according to claim 18, comprising at least two said sweep bars contoured to engage the array and operable for compressing the array by advancing in at least partly opposed directions.

20. The container handling system according to claim 18, wherein the sweep bar is relatively movable at least partly toward and away from an opposed constraint structure also defining receptacles for the containers, the opposed constraint structure being fixed.

* * * * *